United States Patent [19]
Pansier

[11] Patent Number: 5,574,632
[45] Date of Patent: Nov. 12, 1996

[54] POWER SUPPLY COMPRISING A CIRCUIT FOR LIMITING INRUSH CURRENTS

[75] Inventor: Frans Pansier, Eindhoven, Netherlands

[73] Assignee: U.S. Philips Corporation, New York, N.Y.

[21] Appl. No.: 387,059

[22] Filed: Feb. 7, 1995

[30] Foreign Application Priority Data

Feb. 11, 1994 [BE] Belgium .............................. 09400161

[51] Int. Cl.⁶ .............................. H02J 11/00; H02P 13/00
[52] U.S. Cl. .............................. 363/49; 323/901; 323/908
[58] Field of Search .............................. 323/299, 901, 323/908; 363/49; 361/18, 22, 29

[56] References Cited

U.S. PATENT DOCUMENTS

| | | | |
|---|---|---|---|
| 4,642,746 | 2/1987 | Losel | 363/49 |
| 4,982,306 | 1/1991 | Koroncai et al. | 323/908 X |
| 5,087,871 | 2/1992 | Losel | 323/299 |
| 5,420,780 | 5/1995 | Bernstein et al. | 323/908 X |

FOREIGN PATENT DOCUMENTS 2530350  1/1977  Germany .

*Primary Examiner*—Peter S. Wong
*Assistant Examiner*—Y. J. Han
*Attorney, Agent, or Firm*—Bernard Franzblau

[57] ABSTRACT

A power supply which serves to convert an alternating voltage supplied by an electric mains, into a DC voltage, having a rectifier with input terminals for receiving the alternating voltage and output terminals for supplying a pulsating direct voltage. A first capacitor is connected parallel to the output terminals. An inverter has input terminals connected to the first capacitor. A current limiting circuit is connected between one of the rectifier output terminals and an electrode of the first capacitor in order to limit the inrush current occurring when the power supply is switched on. The current limiting circuit includes a parallel connection of a first resistor and a first switching element, with the first switching element being operative to be in an electrically non-conductive state upon switching on of the power supply and to change over to an electrically conductive state some time after the power supply is switched on. A detection circuit establishes the state of the first switching element and cooperates with a start circuit which is operative to generate a start signal for the inverter. When the detection circuit determines that the first switching element is in the conductive state, it prevents activation of the start circuit. Consequently, the power supply cannot operate if the first switching element is short-circuited by a defect.

12 Claims, 3 Drawing Sheets

POWER SUPPLY COMPRISING A CIRCUIT FOR LIMITING INRUSH CURRENTS

BACKGROUND OF THE INVENTION

This invention relates to a power supply for converting an alternating voltage supplied by an electric mains into a desired voltage, comprising rectifier means which include input terminals which are operative to receive the alternating voltage and output terminals which serve to supply a pulsating direct voltage, a first capacitor which is connected parallel to the output terminals, an inverter which includes input terminals which are connected to the first capacitor, and a current limiting circuit which is connected between one of the output terminals of the rectifier means and an electrode of the first capacitor in order to limit an inrush current occurring when the power supply is switched on, which current limiting circuit comprises a parallel connection of a first resistor and a first switching element, the first switching element being conceived to be in an electrically non-conductive state when the power supply is switched on and to change over to an electrically conductive state some time after switching on.

A power supply of this kind is known from U.S. Pat. No. 5,087,871. The first resistor serves to limit the current which after the switching on of the power supply, from the rectifier means to the first capacitor and the input terminals of the inverter. Because the first capacitor has not yet been charged upon switching on, this current could reach a very high value so that it might damage components of the power supply. Shortly after switching on, the first capacitor has been charged and the current is reduced to the much smaller value necessary to keep the inverter in operation. However, the value of this current is still so high that it would cause undesirable development of heat in the first resistor if it were to flow permanently through this resistor. Therefore, shortly after switching on the power supply the first resistor is bridged by the first switching element. The first switching element of the power supply known from the cited document is formed by a MOSFET which, after switching on, is turned on by a suitable control circuit. Other known switching elements, for example a bipolar transistor, a relay or a thyristor (see, for example DE-B-25 30 350) are also suitable for this purpose. All of said switching elements, however, have the drawback that they can become defective such that they are permanently in the conductive state. In that case they short-circuit the first resistor also during the switching on of the power supply so that the inrush current is not limited. The user of the power supply notices this fact only after the inrush current has already caused damage, so that the entire power supply becomes defective.

SUMMARY OF THE INVENTION

It is an object of the invention to provide a power supply of the kind set forth in which a permanently conductive state of the first switching element immediately interrupts the operation of the power supply, so that the user is forced to replace the first switching element before the defect can cause damage. To this end, the power supply in accordance with the invention is characterized in that there are provided detection means for detecting the state of the first switching element, which detection means cooperate with a start circuit which is operative to generate a start signal for the inverter, the arrangement being such that the start circuit can generate the start signal only if the detection means establish that the first switching element is in the non-conductive state.

Generally speaking, inverters require a start voltage or current in order to be activated, either to enable starting of the oscillation of the inverter (in the case of a self-oscillating circuit) or to supply a control and regulating circuit with a voltage (in the case of other types of circuit). Generally speaking, a start circuit derives this start signal from the pulsating direct voltage supplied by the rectifier means; for example, see U.S. Pat. No. 4,642,746. Thanks to the steps of the invention, the start circuit cannot operate if the first switching element is in the conductive state. The device fed by the inverter (for example, a television receiver), therefore, will not operate so that the user is forced to have it repaired.

The detection means may be formed by a circuit which establishes whether an electric current flows through the first switching element. A circuit of this kind may comprise, for example, an amplifier which amplifies the electric voltage across a small resistor, connected in series with the first switching element, and which derives a control signal therefrom which controls the start circuit. An embodiment in which such a resistor can be dispensed with is characterized in that the detection means comprise a series connection of a second switching element and a second resistor, which series connection is connected parallel to the first capacitor, the second switching element being coupled to the first switching element in such a manner that it can be in an electrically conductive state only if the first switching element is in an electrically non-conductive state, the start circuit comprising a series connection of a third switching element and a second capacitor, which series connection forms part of a connection between one of the input terminals of the rectifier means and the negative input terminal of the inverter, a control electrode of the third switching element being connected to the junction of the second switching element and the second resistor, the junction of the third switching element and the second capacitor being connected to a start input of the inverter, the arrangement being such that the third switching element is in an electrically conductive state and supplies a start current for the inverter if the second switching element is in the electrically conductive state.

An embodiment of the device in accordance with the invention which requires only a minimum number of components is characterized in that the start circuit is combined with the detection means, the combined circuit comprising a series connection of a second switching element and a second capacitor, which series connection is connected parallel to the first capacitor, the second switching element being coupled to the first switching element in such a manner that it can be in an electrically conductive state only if the first switching element is in an electrically non-conductive state, the combined circuit making a start current available to the inverter when the second switching element is in the electrically conductive state. In this embodiment the function of the detection means is incorporated in the second switching element which also forms a part of the start circuit. Therefore, no separate parts are required for the detection means.

A simple and inexpensive embodiment of the power supply according to the invention is characterized in that the second switching element is formed by a transistor, the first switching element forming, in the conductive state, a connection between a control electrode and a further electrode of the transistor, said further electrode being chosen so that the main current path of the transistor is blocked when the control electrode is connected to said further electrode, the control electrode being connected to the output terminals of the rectifier means so that the output terminals supply the control electrode with a control voltage, opening the main current path, when the first switching element is in the non-conductive state.

A further embodiment is characterized in that the transistor forms part of a current source circuit which is a part of the start circuit. In this embodiment the current supplied by the start circuit is independent of the instantaneous value of the mains voltage, so that mains voltage fluctuations do not affect the starting time required by the inverter.

An embodiment which can be simply implemented is characterized in that the transistor is a bipolar PNP transistor whose emitter constitutes said further electrode and is connected to the positive electrode of the first capacitor and whose base constitutes the control electrode and is connected to the output terminals of the rectifier means, a further resistor being connected between the control electrode and at least the negative output terminal. Preferably, the further resistor is connected in series with a fourth switching element. The inverter can be simply switched off by means of the fourth switching element, for example in order to minimize the dissipation in a standby state.

A further embodiment of the power supply in accordance with the invention is characterized in that in series with the second switching element there is connected a voltage reference element which is operative to become electrically conductive only when the voltage across this element exceeds a reference value. This embodiment offers the advantage that the start current is blocked for as long as the mains voltage remains below a value determined by the voltage reference element. The circuit is thus simply protected against undervoltages.

BRIEF DESCRIPTION OF THE DRAWINGS

These and other aspects of the invention will be described in detail hereinafter with reference to the drawing.

DESCRIPTION OF THE PREFERRED EMBODIMENTS

Figure 1:
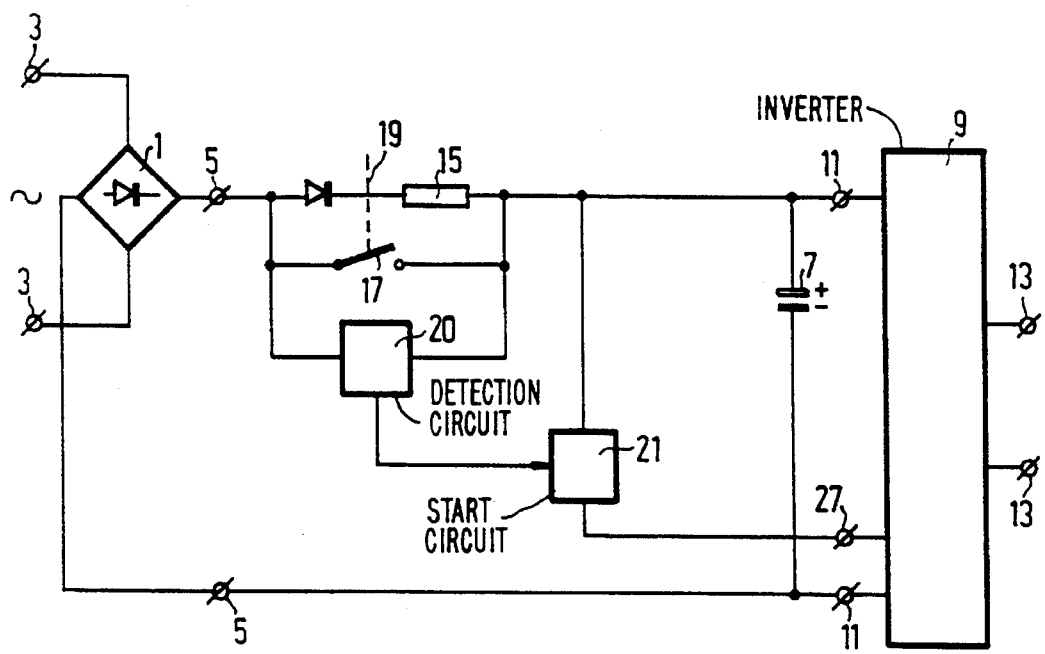
FIG. 1 shows a block diagram illustrating the essential elements of an embodiment of the power supply in accordance with the invention.

The power supply which is shown in the form of a block diagram in FIG. 1 comprises a mains rectifier 1, for example a known rectifier bridge, with input terminals 3 which can be connected to the public alternating current mains and output terminals 5 on which the rectified alternating voltage is available as a pulsating direct voltage. A first capacitor 7 is connected parallel to the output terminals 5. The first capacitor 7 serves as a buffer capacitor wherefrom a direct voltage with a comparatively small ripple voltage can be derived for a known inverter 9 which, for this purpose, is connected to the electrodes of the first capacitor via its input terminals 11.

The inverter 9 is operative to supply, via its output terminals 13, one or more desired direct or alternating voltages for an apparatus which is not shown, for example a television receiver. Between one of the output terminals 5 of the rectifier 1 and one of the electrodes of the first capacitor 7 there is arranged a current limiting circuit which consists of a parallel connection of a first resistor 15 and a first switching element 17. The first switching element 17 can be controlled via a control terminal 19 which is denoted by a dashed line and which is connected to further parts of the circuit or which forms part of a separate control circuit (not shown). An embodiment of such a current limiting circuit is described in detail in, for example U.S. Pat. No. 5,087,871. The first switching element 17 of the cited example is formed by a MOSFET. Another example, in which the first switching element 17 is formed by a thyristor, is disclosed in DE-B-25 30 350. Other known switching elements, such as a bipolar transistor or a relay, are also suitable for use as the first switching element.

When the power supply is switched on, the first capacitor 7 has not yet been charged so that a comparatively large current would flow to this capacitor from the rectifier 1. This current could readily damage parts of the circuit. The first resistor 15 serves to limit this inrush current. To this end, the first switching element 17 is controlled so that this element is in an electrically non-conductive state when the power supply is switched on. The inrush current is thus forced to flow via the first resistor 15, so that the value of this current is limited by this resistor. Shortly after switching on the power, the supply first switching element 17 receives a control signal, via the control terminal 19, so that it enters an electrically conductive state. The current from the rectifier 1 to the first capacitor 7 can then flow via the first switching element so that no energy is lost in the first resistor 15.

If the first switching element 17 is defective, so that it is permanently in the conductive state, the described current limiting circuit would not have the intended effect. That is because all current would flow from the rectifier 1 to the first capacitor 7, via the first switching element 17, already upon switching on of the power supply, so that the inrush current would not be limited. Generally speaking, this will not directly destroy the power supply, so that the inverter 9 is activated and the user does not notice the defect. However, after having been switched on a few times in this manner, the power supply would become defective due to the excessive inrush current, so that damage would be incurred which would be much more costly than the timely replacement of the defective first switching element 17. In order to ensure that the inverter 9 cannot be switched on in the case of the described defect of the first switching element 17 so that the user is forced to have the defect repaired, the circuit comprises detection means 20 for determining the state of the first switching element. The detection means cooperate with a start circuit 21 which is operative to generate a start signal for the inverter 9 and to apply it to a start input 27 of the inverter. Due to this cooperation, the start circuit 21 can generate the start signal only if the detection means 20 establish that the first switching element 17 is in the non-conductive state.

Start circuits for inverters are known per se, see for example U.S. Pat. No. 4,642,746. They serve to derive a current or voltage from the rectified alternating voltage upon switching on of the apparatus, which current or voltage is applied to the inverter so as to start it. In the case of a self-oscillating inverter, this start current is necessary to start the oscillation; in other types it is required to enable the supply of a voltage to a control and regulating circuit. After the inverter has become operational, the inverter itself supplies the necessary auxiliary voltages so that the start circuit is required only for switching on. The detection means 20 may also comprise a circuit which is known per se, for example an amplifier which generates a signal upon detection of an electric voltage across a small resistance connected in series with the first switching element 17, which signal deactivates the start circuit 21.

Figure 2:
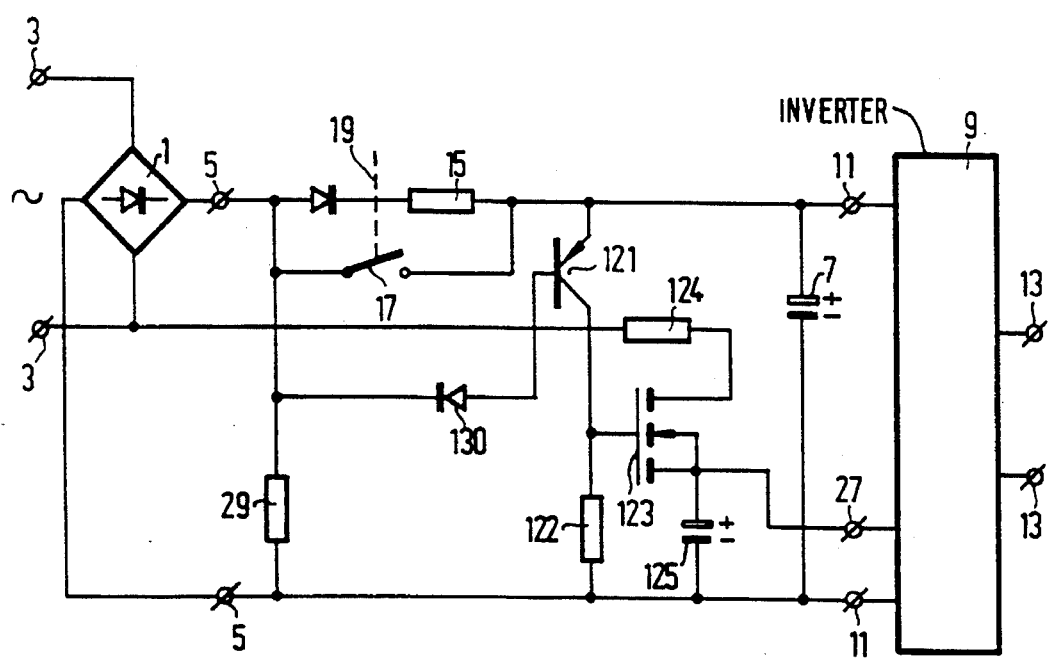
FIG. 2 shows diagrammatically the circuit of a first embodiment of the power supply in accordance with the invention.
Figure 3:
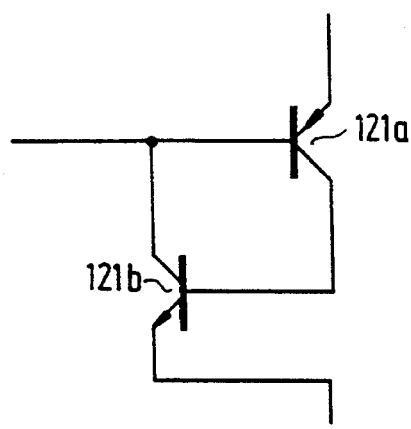
FIG. 3 shows an alternative version of a detail of the diagram shown in FIG. 2.

FIG. 2 shows an embodiment of the device shown in FIG. 1 in which it is not necessary to connect a resistor in series with the first switching element 17. The detection means 20 of the present embodiment comprise a series connection of a second switching element 121 and a second resistor 122. The second switching element 121 of the present embodiment is formed by a bipolar PNP transistor. Other known switching elements, however, can be used equally well as a second switching element, for example a P-MOSFET, a triac, a P-MCT (MOS Controlled Thyristor) or an assembly of a PNP transistor 121a and an NPN transistor 121b as shown in FIG. 3. The advantages of the latter assembly will be described in detail hereinafter.

One electrode (the emitter) of the transistor 121 is connected to the positive pole of the first capacitor 7, whereas another electrode (the collector) is connected to the negative pole of the first capacitor via the second resistor 122. The base of the transistor 121, serving as a control electrode, is connected to the output terminals 5 of the rectifier 1. To this end, between these output terminals there is connected a further resistor 29 which is situated between the negative output terminal 5 and the base of the transistor 121. Via a diode 130, the base is connected to the positive output terminal 5 of the rectifier 1. The diode 130 serves to prevent that, when the apparatus is switched on (when the first capacitor 7 has not yet been charged), the full mains voltage appears across the blocked base-emitter junction of the transistor 121. The transistor 121 would otherwise be destroyed.

The start circuit 21 of the present embodiment comprises a series connection of a third switching element 123 and a second capacitor 125. The junction of the third switching element 123 and the second capacitor 125 is connected to the start input 27 of the inverter 9. The third switching element 123 of the present embodiment is an enhancement MOSFET. Other switching elements can also be used. A control electrode of the third switching element 123 (the gate electrode) is connected to the junction of the second switching element 121 and the second resistor 122.

In the conductive state the first switching element 17 constitutes a direct connection between the emitter and the base of the transistor 121. If the first switching element 17 operates correctly, the direct connection between the base and the emitter of the transistor 121 is interrupted when the apparatus is switched on. Consequently, a voltage difference will occur between the base and the emitter of the transistor 121, so that the transistor is turned on. The junction of the transistor 121 and the second resistor 122 thus becomes positive, so that the control electrode of the third switching element 123 also becomes positive and this switching element enters the electrically conductive state. Via the third switching element 123 and a current limiting resistor 124 which is connected in series therewith, the start input 27 of the inverter 9 is then connected to the input terminal 3 so that a start current flows from the alternating current mains to the inverter.

Figure 4:
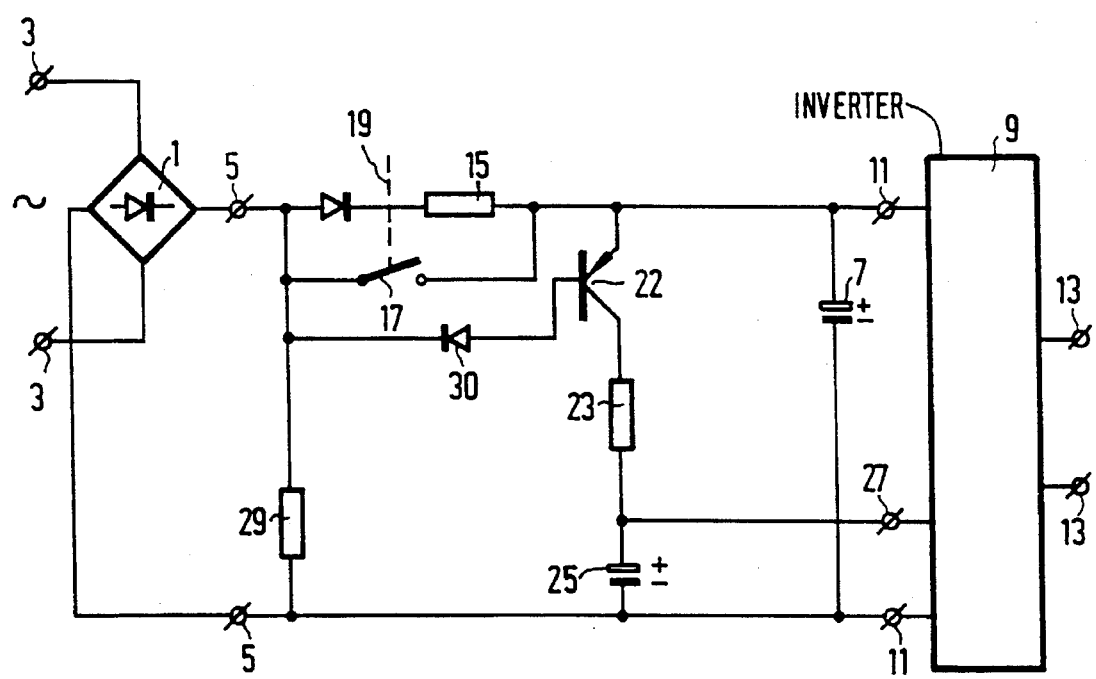
FIG. 4 shows diagrammatically the circuit of a second, very simple embodiment.

FIG. 4 shows an embodiment of the device shown in FIG. 1; in which the functions of the detection means 20 and the start circuit 21 are implemented in a particularly simple and inexpensive way in that the two circuits are combined. The combined circuit of the present embodiment comprises a series connection of a second switching element 22, a second resistor 23 and a second capacitor, which series connection is connected parallel to the first capacitor 7. An electrode of the second capacitor 25 is connected to the start input 27 of the inverter 9. The second switching element 22 may be constructed in the same way as the second switching element 121 of the embodiment shown in FIG. 2. However, it acts as the second switching element 121 as well as the third switching element 123. Its control electrode is connected, via a diode 30 which corresponds to the diode 130 of FIG. 2, to the positive output terminal of the rectifier means 1. The state of conductivity of the second switching element 22 is dependent on the state of conductivity of the first switching element in the same way as in the embodiment shown in FIG. 2. The operation of the combined circuit will be described in detail hereinafter with reference to FIG. 5.

Figure 5:
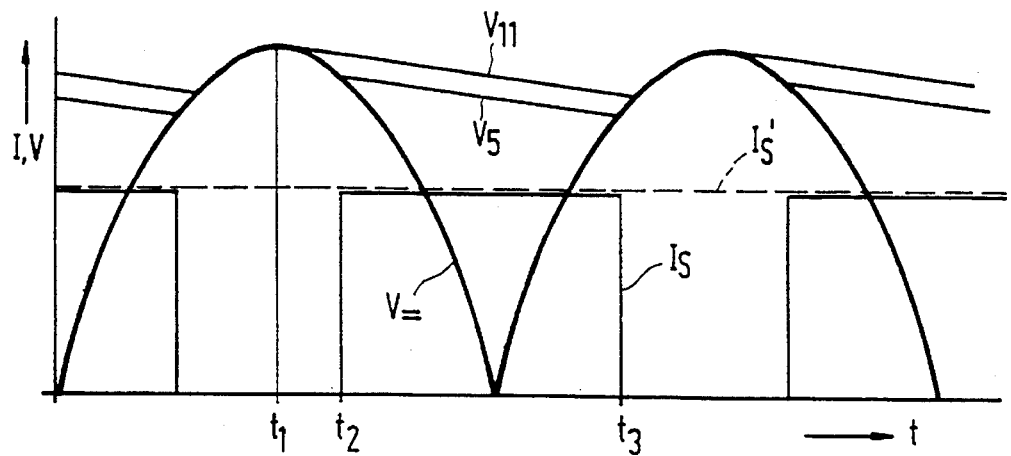
FIG. 5 shows a diagram illustrating the variation of some currents and voltages in the circuit shown in FIG. 4.

FIG. 5 shows a diagram in which the time t is plotted horizontally and the value of some currents I and voltages V is plotted vertically. The curve denoted by the reference $V_=$ represents the variation of the rectified mains voltage, consisting of voltage pulses in the form of half sinewaves. After smoothing by the first capacitor 7, the voltage is shaped as a direct voltage with a small ripple as denoted by the curve $V_{11}$. This is the voltage applied to the input terminals of the inverter 9. The curve denoted by the reference $V_5$ represents the variation of the voltage on the positive output terminal 5 of the rectifier 1 when the first switching element 17 is in the non-conductive state. The rectified alternating voltage $V_=$ reaches a maximum value at the instant $t_1$. The voltages $V_5$ and $V_{11}$ are then equal to $V_=$. When $V_=$ subsequently decreases, $V_{11}$ will remain substantially constant due to the effect of the first capacitor 7. A slight decrease occurs in that this capacitor applies a current to the inverter 9 and hence looses charge. The voltage $V_5$ will initially follow the decrease of the voltage $V_=$ and will hence become lower than $V_{11}$. This decrease continues until $V_5 = V_{11} - (V_{diode} + V_{be})$, where $V_{diode}$ is the diode voltage of the diode 30 and $V_{be}$ is the base-emitter voltage of the transistor 22. At the instant $t_2$ at which $V_5$ reaches this value, a base current starts to flow in the transistor 22 so that the difference between $V_{11}$ and $V_5$ remains constant. This situation prevails until the next pulse of $V_=$ reaches a value which is greater than the instantaneous value of $V_5$. As from this instant, denoted by the reference $t_3$, $V_5$ follows the value of $V_=$ again. During the period between $t_2$ and $t_3$, the base voltage of the transistor 22 is lower than the emitter voltage, so that the transistor is turned on. Via the transistor 22 and the second resistor 23, a start current $I_s$ then flows to the start input 27 of the inverter 9. The start circuit remains active for as long as the first switching element 17 remains in the non-conductive state. When the first switching element 17 is in the conductive state, a direct connection exists between the base and the emitter of the transistor 21 so that this transistor is not turned on. This situation arises when the first switching element 17 receives a relevant signal via the control terminal 19; this occurs when the inverter 9 is in operation. In that case the inverter itself provides the necessary auxiliary voltages for continued operation, so that the start circuit is no longer necessary. However, if the first switching element 17 is defective, and hence permanently electrically conductive, the start circuit is not activated when the apparatus is switched on, so that the inverter 9 does not start. It appears from the foregoing that the transistor 22 has a dual function:

it serves on the one hand to detect the state of conductivity of the first switching element 17 (like the transistor 121 in FIG. 2) and on the other hand to provide the start current $I_s$ (like the transistor 123 in FIG. 2). Consequently, in the embodiment shown in FIG. 4 the implementation of the detection means 20 and the start circuit 21 requires a minimum number of components.

FIG. 5 clearly shows that the start current $I_s$ is shaped as a series of pulses: between the instants $t_2$ and $t_3$ $I_s$ has a substantially constant value and it equals zero between $t_3$ and $t_2$. Generally speaking, a pulsed start current is very well suitable for starting the inverter 9. If it is desired to supply the inverter 9 with a substantially constant start current, the transistor 22 may be replaced by, for example a thyristor or an element which behaves as a thyristor. An example of such an element is formed by the combination of a PNP transistor 121a and an NPN transistor 121b as shown in FIG. 3. Such an element remains conductive after disappearance of the control voltage. Consequently, when this element is used the start current $I_s'$ will vary as denoted by a dashed line in FIG. 5. It is to be noted that in the embodiment of FIG. 2 the start current, originating from one of the input terminals 3, will always be an alternating current. When the second switching element 121 is chosen so that the start current is present only between the instants $t_2$ and $t_3$, the start current will be shaped as a part of a sinewave. When the second switching element 121 is chosen so that no interruptions occur in the start current, this current will be shaped as a succession of full sinewaves.

Figure 6:
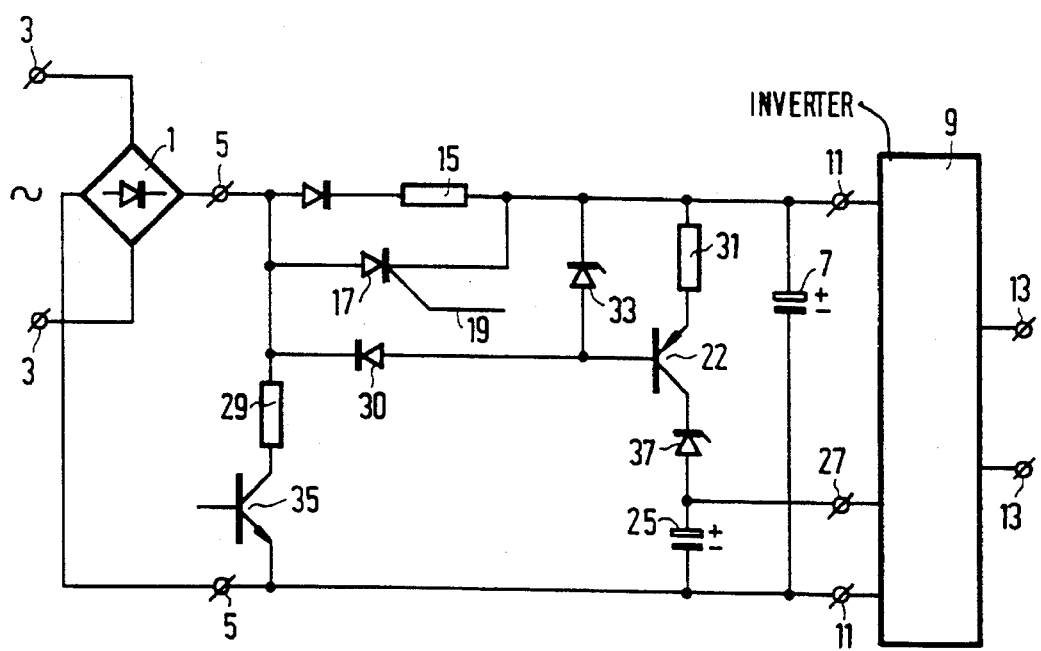
FIG. 6 shows diagrammatically a more extensive embodiment.

FIG. 6 shows diagrammatically an embodiment of the power supply in accordance with the invention with a number of additional details in comparison with FIG. 4. The same reference numerals are used for the components which correspond to the embodiment shown in FIG. 4. In the present embodiment the first switching element 17 is constructed as a thyristor.

A first expansion relative to FIG. 4 consists in that the transistor 22 of the present embodiment forms part of a current source circuit which also comprises an emitter resistor 31 and a zener diode 33 which is connected parallel thereto. Consequently, the start current applied to the start input 27 is independent of the instantaneous mains voltage on the input terminals 3.

A second modification consists in that the further resistor 29 is connected in series with a fourth switching element 35 which is formed by a bipolar NPN transistor in the present embodiment. Other known switching elements, for example a MOSFET, can also be used, if desired. The control electrode (the base in the present example) of the fourth switching element 35 receives, in a manner not shown, a signal which sets this switching element to the non-conductive state when the power supply is to be set, for example to a standby state as is customary in the case of television receivers. Consequently, no current can flow through the further resistor 29 so that the dissipation is minimized.

A third modification consists in that a voltage reference element 37 is connected in series with the second switching element 22, which voltage reference element is a zener diode in the present example. This element becomes electrically conductive only when the voltage across the element exceeds a given value. This means that a start current can flow to the start input 27 only when the mains voltage on the input terminals 3 exceeds a predetermined value. Consequently, the inverter 9 will not start when the mains voltage is too low for suitable operation of the apparatus powered by the inverter. Evidently, this protection is operative only when the apparatus is started. A later decrease of the mains voltage will not interrupt the operation of the inverter.

Evidently, it is not necessary to make all modifications shown in FIG. 6. These modifications are merely options which may make sense in conjunction with the simple embodiment shown in FIG. 4. Other modifications, in combination with one or more of the modifications shown in FIG. 6 or not, are also feasible.

I claim:

1. A power supply for converting an alternating voltage supplied by an electric mains into a desired voltage, comprising: rectifier means which include input terminals operative to receive the alternating voltage and output terminals which supply a pulsating direct voltage, a first capacitor connected parallel to the output terminals, an inverter which includes input terminals connected to the first capacitor, and a current limiting circuit connected between one of the output terminals of the rectifier means and an electrode of the first capacitor in order limit an inrush current occurring when the power supply is switched on, wherein said current limiting circuit comprises a parallel connection of a first resistor and a first switching element with the first switching element in an electrically non-conductive state when the power supply is switched on and arranged to change over to an electrically conductive state some time after switch on of the power supply, and detection means for detecting the state of the first switching element and which cooperate with a start circuit operative to generate a start signal for the inverter such that the start circuit can generate the start signal only if the detection means establish that the first switching element is in the non-conductive state.

2. A power supply as claimed in claim 1, wherein the detection means comprise a series connection of a second switching element and a second resistor connected parallel to the first capacitor, the second switching element being coupled to the first switching element in a manner such that it can be in an electrically conductive state only if the first switching element is in an electrically non-conductive state, the start circuit comprising a second series connection of a third switching element and a second capacitor, which second series connection forms part of a connection between one of the input terminals of the rectifier means and the negative input terminal of the inverter, a control electrode of the third switching element being connected to a junction of the second switching element and the second resistor, a junction of the third switching element and the second capacitor being connected to a start input of the inverter, and wherein the third switching element is in an electrically conductive state and supplies a start current for the inverter if the second switching element is in the electrically conductive state.

3. A power supply as claimed in claim 2 wherein the second switching element comprises a transistor, the first switching element forming, in its conductive state, a connection between a control electrode and a further electrode of the transistor, said further electrode being chosen so that the main current path of the transistor is blocked when the control electrode is connected to said further electrode, the control electrode being connected to the output terminals of the rectifier means so that the output terminals supply the control electrode with a control voltage, opening the main current path, when the first switching element is in its non-conductive state.

4. A power supply as claimed in claim 3, wherein the transistor is a bipolar PNP transistor whose emitter constitutes said further electrode and is connected to a positive electrode of the first capacitor and whose base constitutes the control electrode and is connected to the output terminals of the rectifier means, and means connecting a further resistor between the transistor control electrode and at least the negative output terminal.

5. A power supply as claimed in claim 4, wherein the further resistor is connected in series with a fourth switching element.

6. A power supply as claimed in claim 2 further comprising a voltage reference element connected in series with the second switching element and operative to become electrically conductive only when the voltage across said reference element exceeds a reference value.

7. A power supply as claimed in claim 1, wherein the start circuit is combined with the detection means to form a combined circuit comprising a series connection of a second switching element and a second capacitor connected parallel to the first capacitor, the second switching element being coupled to the first switching element such that it can be in an electrically conductive state only if the first switching element is in an electrically non-conductive state, the combined circuit making a start current available to the inverter when the second switching element is in the electrically conductive state.

8. A power supply as claimed in claim 7, wherein the second switching element forms part of a current source circuit which is a part of the start circuit.

9. A power supply as claimed in claim 7, wherein the second switching element comprises a transistor, the first switching element forming, in its conductive state, a connection between a control electrode and a further electrode of the transistor, said further electrode being chosen so that the main current path of the transistor is blocked when the control electrode is connected to said further electrode, the control electrode being connected to the output terminals of the rectifier means so that the output terminals supply the control electrode with a control voltage, opening the main current path, when the first switching element is in its non-conductive state.

10. A power supply as claimed in claim 7 further comprising a voltage reference element connected in series with the second switching element and operative to become electrically conductive only when the voltage across said reference element exceeds a reference value.

11. A power supply as claimed in claim 9 wherein the control electrode of the transistor is connected to the output terminal of the rectifier means via a diode.

12. A power supply as claimed in claim 1 wherein the detection means and start circuit comprise:

a series circuit of a switchable transistor and a second capacitor connected in parallel with the first capacitor such that one main electrode of the switchable transistor is connected to one electrode of the first capacitor, means coupling the first switching element between said one main electrode of the switchable transistor and a control electrode of the switchable transistor and with one terminal of the first switching element coupled to an output terminal of the rectifier means so that, when the first switching element is conductive the switchable transistor is cut-off and when the first switching element is non-conductive the switchable transistor is conductive when the voltage on the first capacitor exceeds the pulsating direct voltage at the output terminals of the rectifier means, whereby the switchable transistor supplies the start signal to the inverter.

\* \* \* \* \*